United States Patent [19]

Yoon

[11] Patent Number: 5,048,993
[45] Date of Patent: Sep. 17, 1991

[54] BALL JOINT ASSEMBLY

[75] Inventor: Deok Y. Yoon, Kwangmyeong, Rep. of Korea

[73] Assignee: SamSung Electronics Co., Ltd., Suwon, Rep. of Korea

[21] Appl. No.: 589,619

[22] Filed: Sep. 28, 1990

[30] Foreign Application Priority Data

Dec. 30, 1989 [KR] Rep. of Korea ............... 89-20717[U]

[51] Int. Cl.$^5$ .............................................. F16D 1/00
[52] U.S. Cl. ..................................... 403/24; 403/143; 403/122; 123/193 P; 92/187
[58] Field of Search ................. 403/24, 143, 141, 122; 123/193 P; 74/44; 92/187, 188

[56] References Cited

U.S. PATENT DOCUMENTS

| | | | |
|---|---|---|---|
| 1,534,728 | 4/1925 | Noad | 92/187 X |
| 3,069,210 | 12/1962 | Rogers et al. | 92/187 |
| 3,482,487 | 12/1969 | Leffers | 92/187 X |
| 3,978,772 | 9/1976 | Miyao et al. | 92/188 X |
| 4,372,179 | 2/1983 | Dolenc et al. | 123/93 P X |

FOREIGN PATENT DOCUMENTS

94057 7/1980 Japan .................................. 92/187

Primary Examiner—Andrew V. Kundrat
Attorney, Agent, or Firm—Robert E. Bushnell

[57] ABSTRACT

A ball joint assembly provided with a connecting rod, which has a connecting member formed at one end and a ball head formed at other end, and a piston having a ball seat for placing a ball head therein, and a cylindrical sleeve protruding from the rear end of the piston having a diameter less than that of the cross section of the piston and having at least two inserting holes formed at predetermined places around its inner circumference, a ball seat formed inside the sleeve and having a projecting section protruding from the rear end of the piston to receive the ball head therein, and a flexible member having a central portion at the center of which a hole is formed to pass through a connecting rod and at least two leaf portions extended from both sides or a plurality of directions from the central portion so as to support the ball head in the ball seat, in which the flexible member is fixed by a mounting means to the sleeve by either inserting the ends of the leaf portions into inserting holes on the sleeve or bolting the ends of the leaf portions onto the sleeve.

19 Claims, 6 Drawing Sheets

BALL JOINT ASSEMBLY

BACKGROUND OF THE INVENTION

The invention is related to providing a ball joint assembly disposed between a connecting rod and a piston to smoothly convert rotational motion of a crankshaft into reciprocating motion of a piston, and particularly to providing a ball joint assembly including a ball head of a connecting rod mounted on the safety seat of a piston, in the manner that a flexible member is flexibly supported against the ball head, thereby reducing the vibration and noise from friction between the safety seat and the ball head and having a relatively higher efficiency in operation.

The invention is particularly adapted to a compressor such as an air conditioner, etc.

Figure 5:
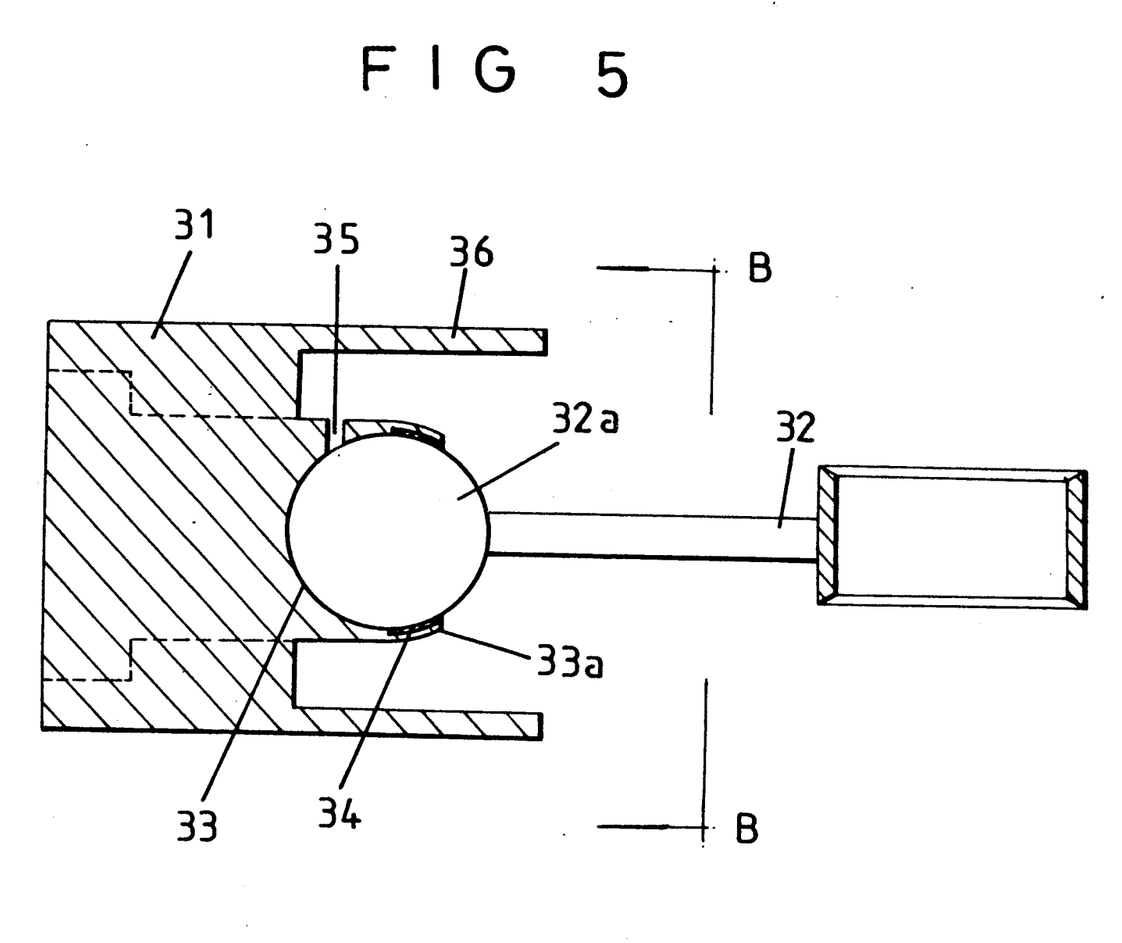
FIG. 5 is a plan view of a ball joint assembly in a piston according to the prior art.
Figure 6:
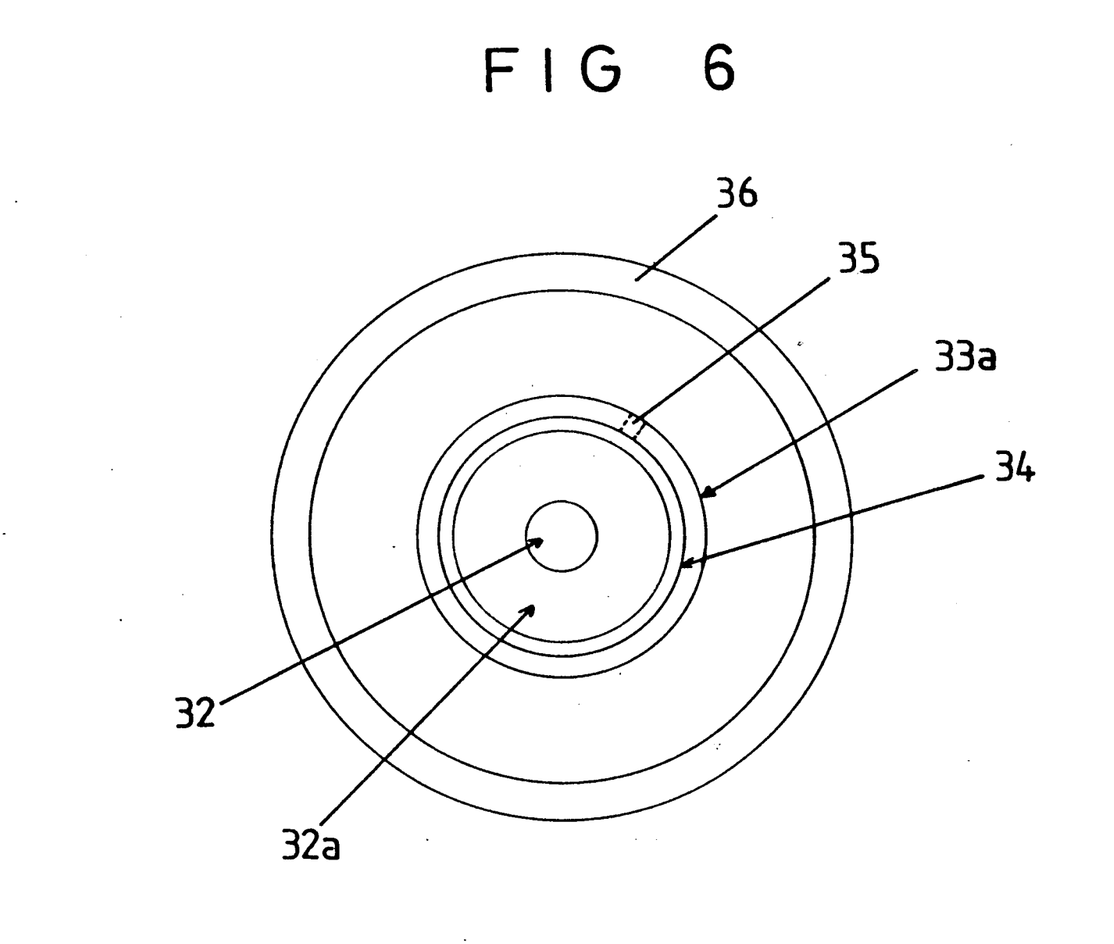
FIG. 6 is a crosssectional view taken alone line A—A of FIG. 5.

In a conventional ball joint assembly as shown in FIG. 5 and FIG. 6, a ball joint assembly comprises a piston 31 and a connecting rod 32 with a ball head 32a formed on its one end, in which the piston 31 is provided with a sleeve 36 formed around its circumferential wall and a safety seat 33 formed on its central portion to receive the ball head 32a, both of which are respectively protruded from the rear end of the piston 31. The safety seat 33 includes a projecting section 33a protruding backward therefrom, a wear resistant resin 34 attached to the inner wall of the projecting section 33a and a hole 35 formed at a predetermined place near the base of the protruded safety seat 33. Therefore, as the ball head 32a is fitted into the safety seat 33, a caulking of the projecting section 33a against the ball head 32a, together with the wear resistant resin 34 is performed to freely rotate the ball head 32a therein.

Nevertheless, the conventional ball joint assembly has problems as follows: during caulking, the projecting section 33a seldom supports the ball head 32a at the exact position to be seated due to uneven pressure against the ball head 32a, it forces the available surface of the ball head 32a to be unevenly contacted with the surface of the projecting section 33a, thereby causing an uneven wear at the ball head 32a or the ball seat 33.

Furthermore, if the projecting section 32a is subjected to excessive force during caulking to tightly press the ball head 32a into the ball seat 33, it produces overheating during rotation of the ball head 32a. That is, the excessive caulking causes a piston connecting device to require a relatively higher load. With this, no play occurs between the ball head 32a and the ball seat 33. It blocks the flowing of lubricants into a gap between the ball head 32a and the ball seat 33 through the air hole 35.

Also, the area of the projecting section 33a is sized to the ball head 32a to prevent its escape from the ball seat 33 and therefore, exposure of the ball head 32a with respect to the lubricants is decreased.

Due to this, an oil film is not formed at the inner surface of the ball seat 33, and results in overheating at the ball seat 33 during the sliding of the ball head 32a.

The faster the rotating speed of a motor, transmitting its rotating force to the connecting rod 32 is, the higher the frictional energy of the ball head 32a in the ball seat 33. For example, the speed is about 3,500 revolutions per minute (rpm) at 60 Hertz per second. A relatively higher frictional energy causes an extremely uneven wear at the ball seat 33 and/or the ball head 32a. As a result, excessive play takes place between the ball seat 33 and the ball head 32a. Furthermore, since the projecting section 33a is made of steel having a relatively higher rigidity, a gap formed between the ball head 32a and the ball seat 33 can not be removed due to the limitation of the caulking of the projecting section 33a against the ball head 32a. Therefore, a hammer therefore, a hammer hitting phenomena of the ball hitting the ball head 32a against the ball seat 33 during operation, generates noise and vibration of the ball head 32a.

SUMMARY OF THE INVENTION

In view of the foregoing problems, the object of the invention is to provide a ball joint assembly which has high efficiency, and reduced noise, friction, and vibration.

According to one embodiment of the invention, there is a ball joint assembly, a connecting rod with a connecting member at one end and a ball head at the other end, and a piston having a ball seat for placing the ball head therein, utilizing; a cylindrical sleeve protruding from the rear end of the piston with a diameter less than that of the cross section of the piston having at least two inserting holes formed at predetermined places around its inner circumference, a ball seat inside sleeve and having a projecting section protruding from the rear end of the piston to receive the ball head, and a flexible member having a central portion at the center of which these is a hole for the connecting rod to pass through; and at least two leaf portions extending outward from both sides or a plurality of directions from the central portion so as to flexible support the ball head in the ball seat, in which the flexibly member is fixed by a mounting means to the sleeve by inserting the ends of the leaf portions into the inserting holes of the sleeve.

Also, according to the other embodiment of the invention, the flexible member is mounted on the sleeve. The flexible member is fixed at both ends of its leaf portions by a mounting means at a predetermined position about the rear section of the sleeve.

According to the invention, the ball joint assembly has the advantage that since the leaf portion of the flexible member can press the ball head into the ball seat, the ball head is contacted by a uniform force with the force with the inner surface of the ball seat, the maximum depth of the ball seat is made shorter than the radius of the ball head to decrease a contacting surface with respect to the ball head, and also the maximum exposure of the ball head with respect to lubricants inserted into an enclosure of the sleeve and the flexible member reduces frictions generated between the ball seat and the ball head to a minimum.

BRIEF DESCRIPTION OF DRAWINGS

The present invention will be described in detail by reference to the accompanying drawings, in which.

DESCRIPTION OF THE PREFERRED EMBODIMENT

Figure 1:
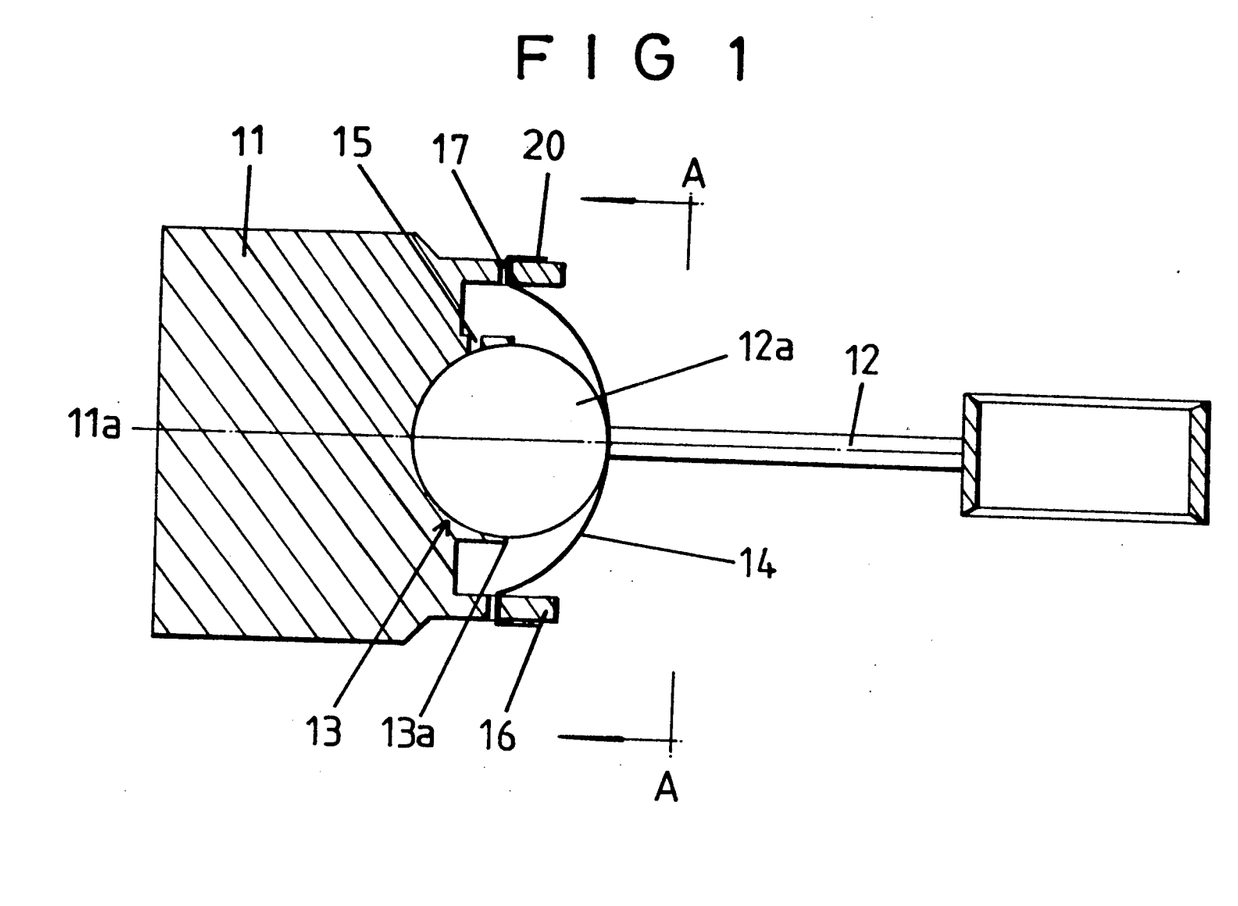
FIG. 1 is a plan view of a ball joint assembly in a piston according to one embodiment of the invention.
Figure 2:
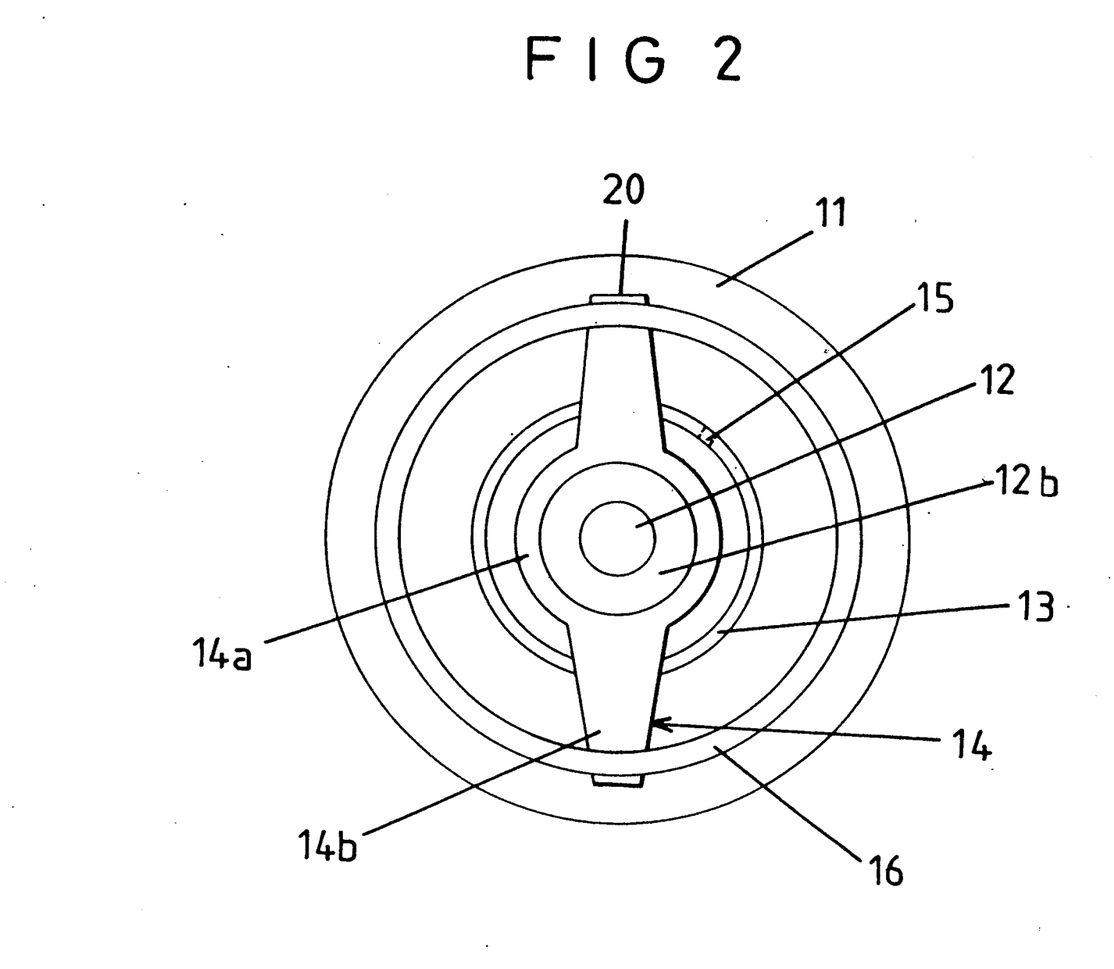
FIG. 2 is a crosssectional view taken alone line A—A of FIG. 1.
Figure 3:
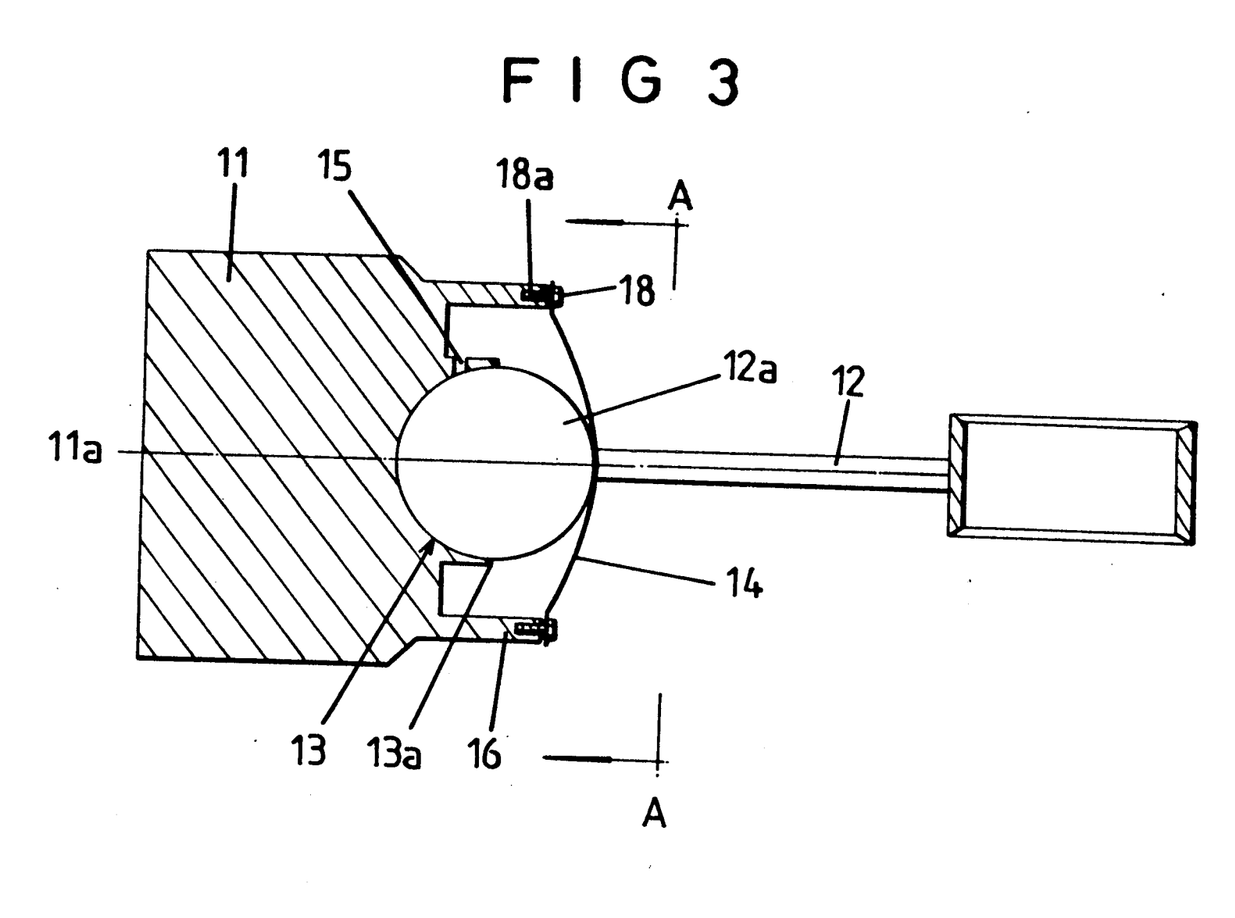
FIG. 3 is a plan view of a ball joint assembly in a piston according to the other embodiment of the invention.

FIGS. 1, 2 and 3 illustrate a ball joint assembly for a piston in accordance with embodiments of the invention.

According to the first embodiment, the ball joint assembly functions as a piston connecting connecting apparatus and includes: a ball head 12a on one end of a connecting rod 12 seated onto a ball seat 13 of a piston 11, and a flexible member 14 mounted to support the ball head 12a in the ball seat 13.

That is to say, a cylindrical sleeve 16 protrudes from the rear section of position 11 and is coaxially aligned with a central axis 11a of the piston 11, wherein the diameter of the sleeve 16 is smaller than that of the piston 11 and the inner diameter of the sleeve 16 is larger than the outer diameter of a projection section 13a as will be described later. Thus, it is noted that the sleeve 16 is extended by a predetermined height toward the connecting rod 12 with the cylindrical wall being formed the same along its circumference. The sleeve 16 has two or more inserting holes 17 formed at predetermined positions around its wall, or a mounting means 18a is located at at least one predetermined position of the circumference wall in a form of a threaded hole to be able to insert a bolt 18 therein.

The ball seat 13 is coaxially aligned with the central axis 11a of the piston 11, which is provided with a groove i.e., bowl cavity, receiving a part of the ball head 12a formed at one end of the connecting rod 12 and the projecting section 13a protruding integrally from the rear section of the piston 11. The projecting section 13a is extended by a predetermined height slightly less than the radius of the ball head 12a from the groove to seat the ball head 12a thereon. An air passage 15 is near the base of the projecting section 13a, to install lubricants into the fine gap between the ball head 12a and the ball seat 13. Herein, an outer diameter of the projecting section 13a is smaller than an inner diameter of the sleeve 16, and the secant of the ball head 12a positioned at the rear end of the projecting section 13a is smaller than the diameter of the ball head 12a. In other words, the horizontal maximum distance from the chord to the the outer surface of the ball head 12a is smaller than the radius of the ball head 12a, thereby reducing the contacting area of the ball head 12a to the ball seat 13.

A flexible member 14 is provided with a circular central portion 14a having a hole 12b for supporting the connecting rod 12 passed therethrough and at least one leaf portion 14b is extended from a central portion 14a in one body. The central portion 14a has an area the ball head 12a to prevent the escape of the ball head 12a from the ball seat 13. Two or more leaf portions 14b are extended from the circumference of the central portion 14a with the region adjacent to the central portion 14a being relatively wider and being tapered with increasing distance along each leaf 14b away from the central portion 14a. The end portion of the leaf portion 14a is sized to be inserted into the inserting hole 17 of the sleeve 16. The leaf portion 14a is fixed at the end by means of the bolt 18 to the wall of the sleeve 16.

The flexible member 14 has sufficient thickness and strength to support the ball head 12a and allows the ball head 12a to have increased exposure to externally supplied lubricants. In this embodiment, the number of leaf portions 14b is two and the angle of its center line is 180°, but this is not intended to limit the invention.

Therefore, the ball head 12a closely contacts the ball seat 13. The central portion 14a of the elastic member 14 is inserted through its hole 15 into the connecting rod 12 to contact with the ball head 12a. Thereafter, the end of leaf portion 14b is inserted into the inserting hole 17 while being fixed at the mounting portion 18a by means of bolts 18 to the wall of the sleeve 18. Thus, the construction of the ball joint assembly is accomplished.

In second embodiment as shown in FIG. 3, this embodiment is almost the same as first embodiment except for a structure mounting the elastic member 14 on the sleeve 16. That is, the sleeve 16 does not have an inserting hole 17 in first embodiment.

At least one mounting portion 18a is formed on the rear section of the sleeve 16 in a form of a threaded hole to fix the end of the leaf portions 14b by means of the bolt 18 thereto.

Figure 4:
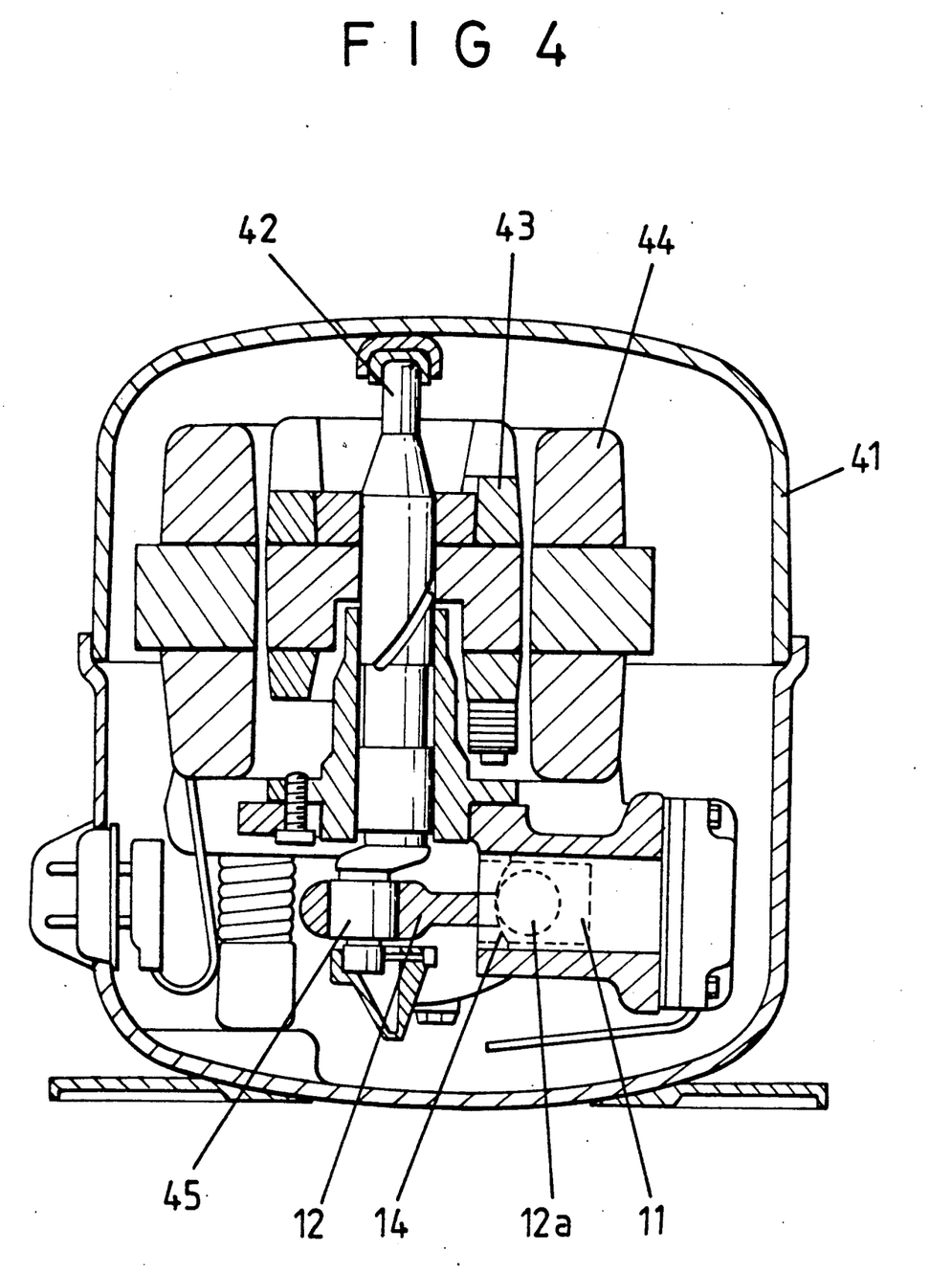
FIG. 4 is a vertical crosssectional view of a compressor having a ball joint assembly of the invention.

FIG. 4 illustrates a compressor adapting to a ball joint assembly. A compressor 40 includes a case 41 provided with an operating portion and the ball joint assembly which are arranged at the upper portion and the lower portion of the case 41. The operating portion is provided with a main shaft 42, a rotor 44 fixed to the main shaft 42, a stator 43 mounted by means of a proper fixing means on the case 41 and a crank shaft 45 connected to the main shaft 42 to transfer the power of the main shaft 42 to the ball joint assembly. The ball joint assembly includes the connecting rod 12, at one end of which is connected to the crank shaft 45 and at the other hand of which has the ball head 12a, and the piston 11 having the ball seat to receive the ball head 12a therein, in which the elastic member 14 is fixed to the piston 11 to elastically support the ball head 12a. Thus, during the operation of the compressor 40, the rotational force of the rotor 43 is transferred through the main shaft 42 to the crank shaft 45 and is converted through the connecting rod 12 into the reciprocal motion of the piston 11 to compress the refrigerant gas introduced into the piston 11.

According to the invention, the distance from the bottom of the ball head to the chord corresponding to the rear section of a sleeve is shorter than the radius of the ball head. It reduces the contacting area of the ball head to the ball seat to smoothly slide the ball head in the ball seat, thereby decreasing the load of the ball joint assembly.

Also, the ball head is pressed onto the ball seat under an uniform flexible force generated by the flexible member to be positioned at a predetermined place where the elastic force of the flexible member can be distributed throughout the contacting area, resulting in uniform wear between the ball head and the ball seat.

Also, the flexible member increases the exposure of the ball head to externally fed lubricants, reducing heat generated between the ball head and the ball seat and friction between the ball head and the ball seat and in wear.

Also, the flexible member compensates for the gap formed by the frictional wear between the ball head and the ball seat. It reduces the hammer phenomena of hitting the ball head on the surface of the ball seat, thereby reducing noise and vibration.

As a result, the invention has a relatively higher efficiency in operation and maintains a noise reduced operation.

What is claimed is:

1. A ball joint assembly provided with a connecting rod and a piston, comprising:
   a piston having a rear end;
   a cylindrical sleeve protruding from said rear end of said piston, said sleeve having a diameter less than the cross section of said piston, and having at least two inserting holes at predetermined places around circumferential wall of said sleeve;
   a ball seat inside the sleeve, having a projecting section protruding from said rear end of said piston to receive a ball head, the ball head being attachable to a connecting rod; and
   a flexible member having a central portion perforated by a hole for the connecting rod to pass through, and at least two leaf portions extending from both sides or a plurality of directions from the central portion so as to support said ball in the ball seat.

2. The ball joint assembly as claimed in claim 1, wherein:
   said ball head is receivable to be seated in said ball seat to a depth less than the radius of said ball head.

3. The ball joint assembly as claimed in claim 1, wherein:
   a number of said leaf portions is two or more.

4. The ball joint assembly as claimed in claim 1, wherein:
   the number of said inserting holes located around said circumference of said sleeve is determined by the number of said leaf portions.

5. The ball joint assembly as claimed in claim 1, further comprised of:
   means for mounting said flexible member upon said sleeve, wherein:
   said flexible member is fixed by a mounting means to said sleeve in a manner that said ends of said leaf portions are inserted into said inserting holes of said sleeve.

6. The ball joint assembly as claimed in claim 1, wherein:
   said leaf portion is mounted on said rear end of said sleeve.

7. A ball joint assembly, comprising:
   reciprocating means having a longitudinal axis and an exposed end, for reciprocating along said longitudinal axis;
   a connecting rod having a first end spaced apart from a second end, with a connecting member at said first end, a spherical head at said second end, and a central axis extending through said member, said rod, and said head;
   a cylindrical sleeve having three exposed faces, said three exposed faces including an inner face, an outer face, and an edge face, said sleeve protruding from said end of said reciprocating means, and being coaxially aligned with said longitudinal axis of said reciprocating means, with an outside diameter less than the outside diameter of said reciprocating means;
   a spherical seat protruding from said end of said reciprocating means, said seat concentrically bounded within said sleeve, said seat having an outer diameter smaller than the inner diameter of said sleeve, said seat having a bowl-shaped cavity to receive and coaxially seat less than a hemispheric portion of said spherical head to a depth within said seat of less than the radius of said spherical head, and said seat having a lubricant passage through said seat to the interface between said spherical head and said bowl-shaped cavity;
   a flexible member with a circular central portion in contact with said spherical head, said circular central portion having a hole permitting passage of said connecting rod, said hole being located at the center of said central portion, said hole having a diameter smaller than the diameter of said spherical head, said flexible member having a plurality of distal leaf portions with each of said leaf portions extending outwardly in a plurality of different directions from an outer circumference of said circular central portion to said sleeve; and
   means for attaching said leaf portions to said sleeve, with said flexible member supporting said spherical head within said bowl-shaped cavity.

8. The ball joint assembly of claim 7, wherein said means for attaching said leaf portions to said sleeve a plurality of face holes located on said inner face distal to receive corresponding ones of said distal leaf portions.

9. The ball joint asseembly of claim 7, wherein said means for attaching said leaf portions to said sleeve comprises a plurality of fasteners mounting said distal leaf portions on said edge face, said fasteners with inserted through said leaf portions into said sleeve.

10. A ball joint assembly, comprising:
    a piston having a longitudinal axis and an exposed end, for reciprocating along said longitudinal axis;
    a connecting rod having a first end and a second end, spaced-apart from a connecting member at said first end, a spherical head at said second end, and a central axis extending through said member, said rod, and said head;
    a cylindrical sleeve having three exposed faces, said three exposed faces including an inner face, an outer face, and an edge face, said sleeve protruding from said end of said piston and being coaxially aligned with said longitudinal axis of said piston, with an outside diameter less than the outside diameter of said piston, and with a plurality of face holes;
    a spherical seat protruding from said end of said piston, said seat concentrically bounded within said sleeve, said seat having an outer diameter smaller than the inner diameter of said sleeve, said seat having a bowl-shaped cavity to receive and coaxially seat less than a hemispheric portion of said spherical head to a depth within said seat of less than the radius of said spherical head, and said seat having a lubricant passage through said seat to the interface between said spherical head and said bowl-shaped cavity; and
    a flexible member with a circular central portion in contact with said spherical head, said circular central portion having a hole permitting passage of said connecting rod, said hole being located at the center of said central portion, said hole having a diameter smaller than the diameter of said spherical head, said flexible member having a plurality of tapered leaves with each leaf having a widest part adjacent to said circular central portion and a narrowest part extending outwardly in a plurality of different directions from the outer circumference of said circular central portion to said sleeve.

11. The ball joint assembly of claim 10, wherein said narrowest part is disposed in said face hole located on said inner face.

12. The ball joint assembly of claim 10, wherein said narrowest part is mounted at a said face hole located on said edge face with a fastener inserted through said narrowest part into said face hole.

13. A ball joint assembly, comprising:
    a first object attached to an exposed spherical head;
    a second object attached to an exposed sleeve, said sleeve having three exposed faces, said three exposed faces including an inner face, an outer face, and an edge face, and said sleeve having a plurality of face holes;
    a spherical seat, concentrically bounded within said sleeve, said seat attached to said second object, said seat having an outer diameter smaller than the inner diameter of said sleeve, said seat having a bowl-shaped cavity to receive and seat less than a hemispheric portion of said exposed spherical head to a depth within said seat of less than the radius of said exposed spherical head, and said seat having a lubricant passage through said seat to the interface between said exposed spherical head and said bowl-shaped cavity; and
    a flexible member with a circular central portion in contact with said exposed spherical head, said circular central portion having a hole permitting passage of said first object, said hole being located at the center of said central portion, said hole having a diameter smaller than the diameter of said exposed spherical head, said flexible member having a plurality of leaf portions with each of said leaf portions extending outwardly in a plurality of different directions from the outer circumference of said circular central portion to said sleeve; and
    means for attaching said leaf portions to said sleeve, with said flexible member supporting said spherical head within said bowl-shaped cavity.

14. A ball joint assembly, comprising:
    a piston having a longitudinal axis and an exposed end, for reciprocating along said longitudinal axis;
    a connecting rod having a first end spaced apart from a second end, with a connecting member at said first end, a spherical head at said second end, and a central axis extending through said member, said rod, and said head;
    a cylindrical sleeve having three exposed faces, said three exposed faces including an inner face, an outer face, and an edge face, said sleeve protruding from said end of said piston and being coaxially aligned with said longitudinal axis of said piston, with a outside diameter less than the outside diameter of said piston, and with a plurality of face holes;
    a spherical seat protruding from said end of said piston, said seat concentrically bounded within said sleeve, said seat having an outer diameter smaller than the inner diameter of said sleeve, said seat having a bowl-shaped cavity to receive and coaxially seat said spherical head, and said seat having a lubricant passage through said seat to the interface between said spherical head and said bowl-shaped cavity; and
    a flexible member with a circular central portion in contact with said spherical head, said circular central portion having a hole permitting passage of said connecting rod, said hole being located at the center of said central portion, said hole having a diameter smaller than the diameter of said spherical head, said flexible member having two leaf portions each extending outwardly in opposite directions from an outer circumference of said circular central portion to said sleeve, supporting said spherical head in said bowl-shaped cavity.

15. The ball joint assembly of claim 14, further comprised of said bowl-shaped cavity having a depth enabling said bowl-shaped cavity to receive and coaxially seat less than a hemispheric portion of said spherical head to a depth within said seat of less than the radius of said spherical head.

16. The ball joint assembly of claim 14, further comprised of said leaf portions are a plurality of leaf portions extending outwardly in a plurality of directions.

17. The ball joint assembly of claim 14, wherein:
    said face holes are positioned to receive said leaf portions and the number of said face holes is in one to one correspondence with the number of leaf portions.

18. The ball joint assembly of claim 14, wherein said leaf portions are inserted through said face holes located on said inner face.

19. The ball joint assembly of claim 14, where said leaf portions are mounted at said face holes located on said edge face with bolts inserted through said leaf portions into said face holes.

* * * * *

UNITED STATES PATENT AND TRADEMARK OFFICE
CERTIFICATE OF CORRECTION

PATENT NO. : 5,048,993
DATED : September 17, 1991
INVENTOR(S) : Deok Young YOON

It is certified that error appears in the above-identified patent and that said Letters Patent is hereby corrected as shown below:

Column 1, Line 54, insert --cover most of the surface of-- before "the" (first occurrence);

Column 2, Line 5, delete "a hammer therefore,";

Line 24, delete "and";

Line 31, change "flexible" to --flexibly--;

Line 32, change "flexibly" to --flexible--;

Line 43, delete "with";

Line 44, delete "the force";

Column 3, Line 8, delete "connecting" (second occurrence);

Line 54, insert --in contact with the-- after "area";

Column 4, Line 12, insert --the-- after "as";

Line 15, insert --the-- after "in";

Line 25, change "44" to --43--;

Line 26, change "43" to --44--;

Line 50, delete "flexible" (first occurrence).

UNITED STATES PATENT AND TRADEMARK OFFICE
CERTIFICATE OF CORRECTION

PATENT NO. : 5,048,993
DATED : September 17, 1991
INVENTOR(S) : Deok Young YOON It is certified that error appears in the above-identified patent and that said Letters Patent is hereby corrected as shown below:

Column 4, Line 56, delete "elastic";

Line 58, insert --,-- after "seat";

IN THE CLAIMS

Claim 1, Column 5, Line 17, insert --head-- after "ball" (first occurrence).

Signed and Sealed this

Third Day of August, 1993

Attest:

MICHAEL K. KIRK

Attesting Officer

Acting Commissioner of Patents and Trademarks